United States Patent [19]

Mangas

[11] Patent Number: 5,156,483

[45] Date of Patent: Oct. 20, 1992

[54] SEAL DEVICE FOR HOLLOW SHAFT

[75] Inventor: Claude R. Mangas, Sartrouville, France

[73] Assignee: Societe Anonyme Dite Hispano Suiza, Saint Cloud Cedex, France

[21] Appl. No.: 686,373

[22] Filed: Apr. 17, 1991

[30] Foreign Application Priority Data

Apr. 19, 1990 [FR] France ................ 90 04990

[51] Int. Cl.⁵ ............................................. B25G 3/00
[52] U.S. Cl. ................................... 403/288; 403/359; 403/349; 403/327
[58] Field of Search ............... 403/349, 348, 359, 327, 403/288

[56] References Cited

U.S. PATENT DOCUMENTS

| | | |
|---|---|---|
| 2,650,484 | 9/1953 | Bujak . |
| 3,370,144 | 2/1968 | Arthur et al. ............... 403/348 X |
| 3,517,953 | 6/1970 | Wright et al. ............... 403/359 X |
| 4,475,737 | 10/1984 | Cook, Jr. et al. . |

FOREIGN PATENT DOCUMENTS

| | | |
|---|---|---|
| 0321119 | 6/1989 | European Pat. Off. . |
| 2393191 | 12/1978 | France . |
| 580318 | 9/1946 | United Kingdom . |

*Primary Examiner*—Andrew V. Kundrat
*Attorney, Agent, or Firm*—Bacon & Thomas

[57] ABSTRACT

A device is disclosed for sealing the end of a hollow shaft having internal splines extending into a passageway longitudinal through the shaft. The device has a locking member pivotally attached to a sealing member which is sized so as to seal the opening in the shaft to prevent the leakage of oil through the shaft opening. The locking member and sealing member each have splines which are capable of engaging the internal splines of the hollow shaft. A knob member is attached to the locking member and extends from an opposite end of the sealing member to enable the user to manually impart rotational movement to the locking member about a generally longitudinal axis. The locking member may be pivoted between a first position wherein its splines are aligned with those of the sealing member such that the device may be slid longitudinally into the open end of the hollow shaft. The internal splines of the shaft extend between transverse planes P1 and P2, and the length of the device is such that, when the sealing member is positioned to seal the end of the shaft, the locking member extends slightly beyond the plane P2. A biasing device is located between the sealing member and the locking member to rotate the locking member to a position in which its splines are no longer aligned with those of the sealing member or the internal splines of the shaft. The splines of the locking member contact the ends of the internal splines lying on plane P2 which prevents the device from being withdrawn from the end of the hollow shaft. When it is desired to remove the device, the knob member is manually manipulated so that the splines of the locking member are in alignment with the internal splines of the shaft, enabling the device to be manually withdrawn from the hollow shaft.

9 Claims, 2 Drawing Sheets

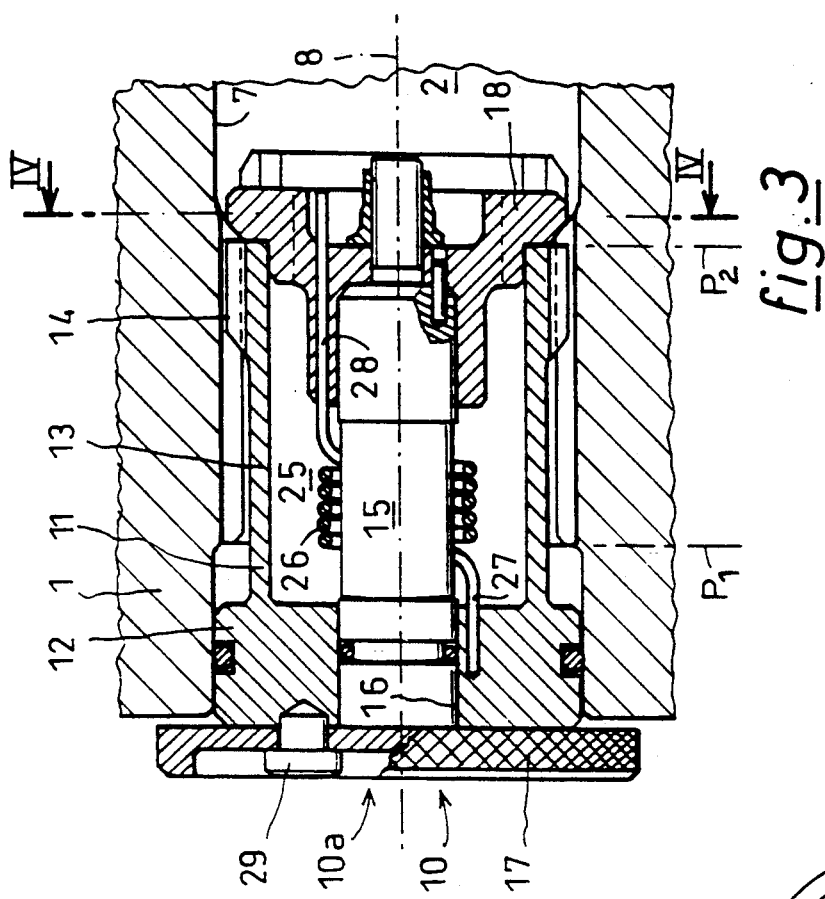
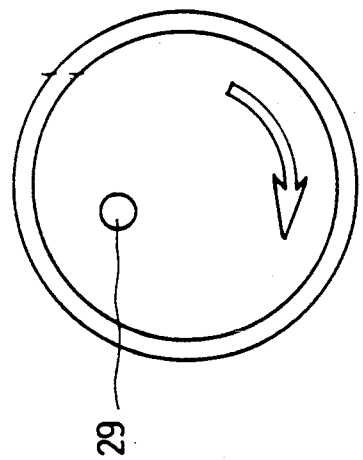
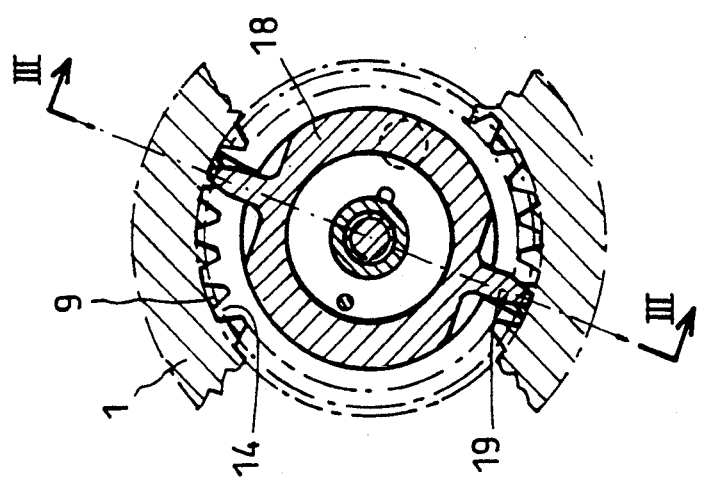

SEAL DEVICE FOR HOLLOW SHAFT

BACKGROUND OF THE INVENTION

The present invention relates to a seal device for sealing the end of a hollow shaft, such shaft having splines extending into a generally longitudinally extending opening.

Gear boxes and other drive systems, particularly those used in in aeronautical engines for driving auxiliary equipment, are often provided with power drives comprising a hollow shaft having internal splines extending into the longitudinal opening through the shaft center. These drive shafts transmit torque to the driven element through the splined connection between them. Drive systems utilizing such drive shafts are well-known in the art.

However, in some applications of the gear box or drive systems, not all of the drive shafts are utilized. While this does not ordinarily present a problem for the gear box or drive system, the unused drive shaft may allow oil to leak from the gear box or drive system through its hollow opening. This is especially critical in such drive systems in which the splined connections are lubricated by oil circulating from the gear box.

SUMMARY OF THE INVENTION

A device is disclosed for sealing the end of a hollow shaft which has internal splines extending into the longitudinal passageway through the shaft. The device has a locking member pivotally attached to a sealing member which is sized so as to seal the opening in the shaft to prevent the leakage of oil through the shaft opening. The locking member and sealing member each have splines or spline teeth which are capable of engaging the internal splines of the hollow shaft. A knob member is attached to the locking member and extends from an opposite end of the sealing member to enable the user to manually impart rotational movement to the locking member about a generally longitudinal axis.

The locking member may be pivoted between a first position wherein its splines or spline teeth are aligned with those of the sealing member such that the device may be slid longitudinally into the open end of the hollow shaft. The splines of the locking member and sealing member slide along the internal splines of the shaft. The internal splines of the shaft extend between transverse planes P1 and P2, and the length of the device is such that, when the sealing member is positioned to seal the end of the shaft, the locking member extends slightly beyond the plane P2. Biasing means are located between the sealing member and the locking member to rotate the locking member to a position in which its splines are no longer aligned with those of the sealing member or the internal splines of the shaft. The splines of the locking member contact the ends of the internal splines lying on plane P2 which prevents the device from being withdrawn from the end of the hollow shaft. When it is desired to remove the device, the knob member is manually manipulated so that the splines of the locking member are in alignment with the internal splines of the shaft, enabling the device to be manually withdrawn from the hollow shaft.

When the device is installed, the sealing member is located between an end face off the hollow shaft and the plane P1 to prevent the leakage of oil through the opening of the hollow shaft.

A motion limiting mechanism is interposed between the knob member and the sealing member to limit the rotational movement of the knob member and, consequently, the locking member between a position in which its splines are aligned with those of the sealing member and a locking position in which the splines are out of alignment with those of the sealing member. A spring may be also interposed between the sealing member and the locking member to bias the locking member toward the position in which its splines are out of alignment with those of the sealing member.

BRIEF DESCRIPTION OF THE DRAWINGS

FIG. 3 is a longitudinal, cross-sectional view taken along line III—III in FIG. 4 showing the device according to the present invention in its locked position.

FIG. 4 is a cross-sectional view taken along line IV—IV in FIG. 3.

FIG. 5 is an end view of the device according to the present invention viewed from the left side of the device shown in FIG. 3.

DETAILED DESCRIPTION OF THE PREFERRED EMBODIMENT

Figure 1:
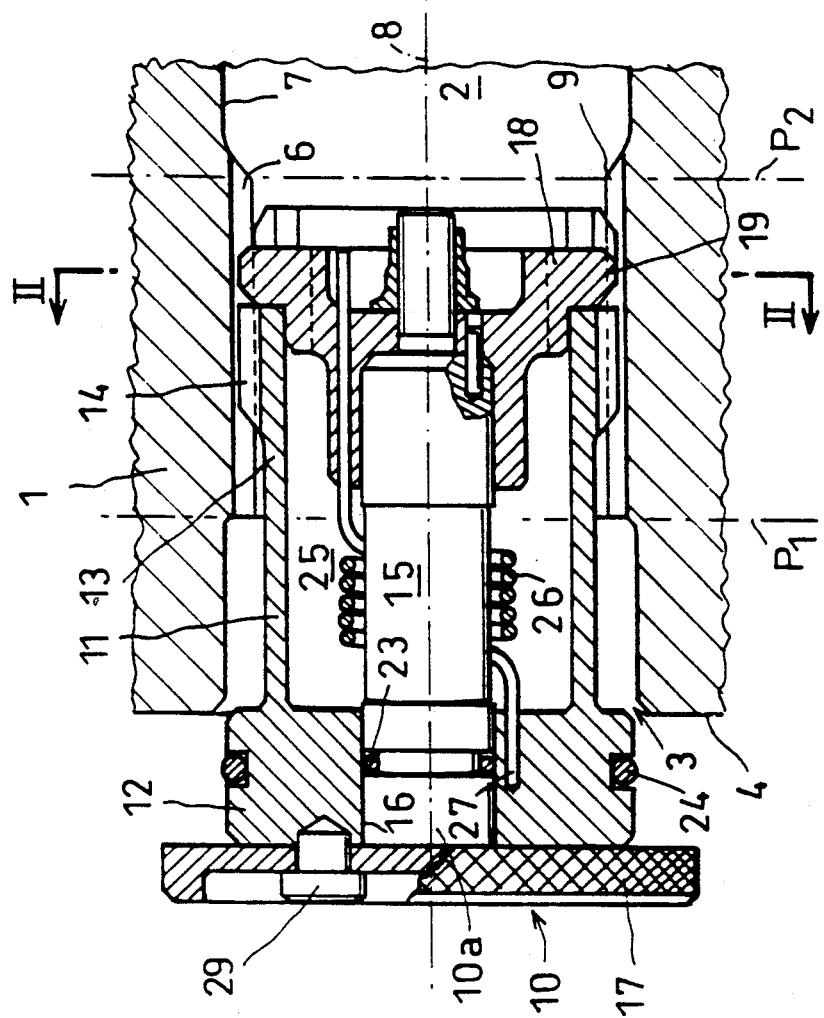
FIG. 1 is a partial, longitudinal, cross-sectional view taken along line I—I in FIG. 2 of the device according to the present invention in the unlocked position.

FIG. 1 illustrates the end for a hollow power drive shaft 1 which typically extends from a gear box (not shown). The shaft 1 has an inner wall 7 which defines a generally longitudinally extending passageway 2 which forms an opening 3 at the end face 4 of the shaft 1. The shaft 1 has internal splines 6 which extend lies at between transverse planes P1 and P2. Plane P1 is axially displaced from the end face 4 and defines one end of the splines 6, while plane P2 is displaced from plane P1 on the opposite side from end face 4 and lies on the opposite ends 9 of the splines 6. Internal wall 7 of the drive shaft 1 defines the outer boundaries of the longitudinally extending passageway 2. Planes P1 and P2 extend perpendicularly to the longitudinal axis 8 of the drive shaft 1. The end faces 9 of the splines 6 extend generally along the plane P2.

A seal device 10 may be provided to tightly seal the opening 3 of the drive shaft 1 to prevent oil from leaking through the generally longitudinally extending passageway 2 from the gear box with which the drive shaft 1 is associated. The seal device 10 comprises a first, sealing member 11 having a generally cylindrical sealing portion 12 which is sized so as to slidably enter the portion of the longitudinal passageway 2 between the end face 4 and plane P1. First, external splines 14 are formed on portion 13 of the sealing member 11 and slidably cooperate with the internal splines 6 located on the drive shaft 1. While splines 14 are engaged with splines 6, the seal member 10 may axially move along the axis 8 with respect to the drive shaft 1, but no relative rotation between these elements can take place.

The seal device 10 also comprises a locking/unlocking assembly 10a which comprises a pin 15 rotatably mounted in an oil-tight manner within a bore 16 formed in the sealing portion 12. An O-ring 23, or the like, is operatively interposed between the pin 15 and the bore 16 to prevent any leakage of oil though this joint. A control knob 17 is fixedly attached to an end of the pin 15 and partially covers the end face 4 of the drive shaft 1.

Figure 2:
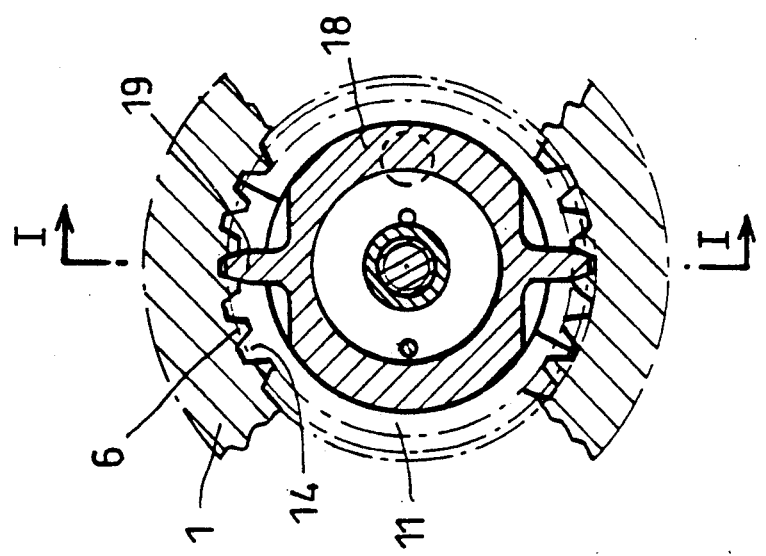
FIG. 2 is a cross-sectional view taken along line II—II in FIG. 1.

A locking member 18 is fixedly attached to an opposite end of the pin 15 such that it is located at an opposite end of the sealing member 11 from the control knob 17. The periphery of the locking member 18 defines toothed contours 19 similar to the contour of the splines 14 and the splines 6 such that the lock member 18 may also axially slide along the splines 6. As illustrated in FIGS. 2 and 4, the number of such teeth 19 may be less than the total number of splines extending around the periphery of the opening 2 through the drive shaft.

The axial length of the sealing member 11 is such that, when the sealing portion 12 is sealing engaged with the longitudinal passageway 2 between the end face and plane P1, the sides of spline teeth 19, formed on the locking member 18, are displaced slightly inwardly of the plane P2. Thus, when the lock member 18 undergoes rotational movement about the longitudinal axis 8, the spline teeth 19 are displaced out of alignment with the spline teeth 14 such that they bear against the ends 9 of the splines 6 formed on the shaft 1. When in this properly inserted position, the control knob 17 will be slight displaced from, or lightly bear against the drive shaft 1. An O-ring seal 24, located on the periphery of the seal portion 12, sealingly bears against the internal wall 7 of the shaft 1 to prevent oil from leaking between these elements.

The sealing member 11 downstream of the sealing portion 12 defines an internal opening 25 to accommodate the pin 15, a portion of the locking member 18 and a torsion spring 26. Spring 26 has one end 27 attached to the sealing member 12 and an opposite end 28 attached to the locking member 18. Torsion spring 26 will normally bias the locking member 18 toward the position shown in FIG. 4 wherein its spline teeth 19 are out of alignment with the splines 14 formed on the sealing member 11.

The rotational movement of the locking member 18 and the control knob 17 with respect to the sealing member 11 may be limited by stud member 29. This member may be fixedly attached to the sealing member 12 and extend through an arcuate opening formed in the control knob 17 so as to limit the rotation movement of the control knob between a first position, in which the spline teeth 19 of the locking member 18 are in alignment with the splines 14, and a second position, wherein the spline teeth 19 are circumferentially displaced so as to bear against the ends 9 of the internal splines 6. Alternatively, an arcuate groove may be formed in the face of the sealing member 29 12 and the stud member may be fixedly attached to the control knob 17.

In order to attach the sealing device to the shaft 1, the control knob 17 is rotated with respect to the sealing member 12 to its first position, which automatically aligns the spline teeth 19 with the splines 14. In this orientation, the device may be axially slid into the end of the shaft 1 until it reaches the position shown in FIG. 3. Once in this position, the control knob 17 is released and torsion spring 26 will automatically rotate the locking member 18 about the axis 8 such that the spline teeth 19 are out of alignment with the internal splines 6, so as to engage the ends of these splines extending along plane P2. This locks the device in the end of the shaft 1 such that O-rings 23 and 24 will prevent oil from leaking out the opening 3 in the end face 4 of the drive shaft 1.

Visual indication may be provided to indicate when the device is in its proper, locked position. This may consist of an aperture passing through the control knob 17 and visual indicia, such as a colored spot, on the face of the sealing portion 12 such that the colored spot may be viewed through the aperture in the control knob 17 when the device has been properly locked into position.

The foregoing description is provided for illustrative purposes only and should not be construed as in any way limiting this invention, the scope of which is defined solely by the appended claims.

I claim:

1. A device for sealing a hollow shaft defining a passageway, the shaft having internal splines extending into the passageway between transverse planes P1 and P2, and an end face comprising:
    a) a first member having a sealing portion adapted to seal the passageway and a second portion having first external splines thereon adapted to engage the internal splines of the shaft;
    b) a second member having second external splines thereon adapted to engage the internal splines of the shaft; and,
    c) connecting means connecting the second member to the first member such that the second member is movable between a first position wherein the first and second splines are positioned to engage the internal splines of the shaft and a second position wherein the second splines are displaced with respect to the first splines so as to prevent engagement of the second splines and the internal splines of the shaft.

2. The device of claim 1 wherein the connecting means comprises a pin attached to the second member and rotatably supported by the first member.

3. The device of claim 2 further comprising biasing means operatively interposed between the first and second members so as to bias the second member toward its second position.

4. The device of claim 3 wherein the biasing means comprises a torsion spring.

5. The device of claim 2 further comprising a knob member fixedly attached to the pin such that rotational movement of the knob member causes rotational movement of the second member.

6. The device of claim 5 wherein the second member and knob member are located at opposite ends of the first member.

7. The device of claim 6 wherein the plane P2 is located further away from the end face of the shaft than is plane P1 and wherein an axial distance between the knob member and the second splines on the second member is such that, when the second splines contact ends of internal splines at plane P2, the knob member is adjacent the end face of the hollow shaft.

8. The device of claim 5 further comprising means operatively interposed between the first member and the knob member to limit the rotational movement of the knob member.

9. The device of claim 1 further comprising visible indicia means to indicate when the second member is in its second position.

* * * * *

UNITED STATES PATENT AND TRADEMARK OFFICE
CERTIFICATE OF CORRECTION

PATENT NO. : 5,156,483

DATED : October 20, 1992

INVENTOR(S) : MANGAS

It is certified that error appears in the above-identified patent and that said Letters Patent is hereby corrected as shown below:

Column 4, line 6 before "face" insert —end—.

Signed and Sealed this

Second Day of November, 1993

*Attest:*

BRUCE LEHMAN

*Attesting Officer*  *Commissioner of Patents and Trademarks*